United States Patent [19]

Bryant

[11] Patent Number: 4,905,761

[45] Date of Patent: Mar. 6, 1990

[54] MICROBIAL ENHANCED OIL RECOVERY AND COMPOSITIONS THEREFOR

[75] Inventor: Rebecca S. Bryant, Bartlesville, Okla.

[73] Assignee: IIT Research Institute, Chicago, Ill.

[21] Appl. No.: 226,352

[22] Filed: Jul. 29, 1988

[51] Int. Cl.$^4$ .............................................. E21B 43/22
[52] U.S. Cl. ..................................... 166/246; 166/273; 166/274; 435/42; 435/252.4
[58] Field of Search ............... 166/246, 271, 273, 274; 435/42, 252.4

[56] References Cited

U.S. PATENT DOCUMENTS

| | | | |
|---|---|---|---|
| 2,413,278 | 12/1946 | Zobell | 166/246 X |
| 2,807,570 | 9/1957 | Updegraff | 166/246 |
| 3,032,472 | 5/1962 | Hitzman | 166/246 |
| 3,105,014 | 9/1963 | Harrison | 166/246 |
| 3,185,216 | 5/1965 | Hitzman | 166/246 |
| 4,475,590 | 10/1984 | Brown | 166/246 |
| 4,522,261 | 6/1985 | McInerney et al. | 166/246 |
| 4,610,302 | 9/1986 | Clark | 166/246 |

FOREIGN PATENT DOCUMENTS 140067  2/1980  German Democratic Rep. ..................................... 166/246

Primary Examiner—George A. Suchfield
Attorney, Agent, or Firm—Fitch, Even, Tabin & Flannery

[57] ABSTRACT

A method is provided for microbial enhanced oil recovery, wherein a combination of microorganisms is empirically formulated based on survivability under reservoir conditions and oil recovery efficiency, such that injection of the microbial combination may be made, in the presence of essentially only nutrient solution, directly into an injection well of an oil bearing reservoir having oil present at waterflood residual oil saturation concentration. The microbial combination is capable of displacing residual oil from reservoir rock, which oil may be recovered by waterflooding without causing plugging of the reservoir rock. Further, the microorganisms are capable of being transported through the pores of the reservoir rock between said injection well and associated production wells, during waterflooding, which results in a larger area of the reservoir being covered by the oil-mobilizing microorganisms.

10 Claims, 1 Drawing Sheet

Figure 1

MICROBIAL ENHANCED OIL RECOVERY AND COMPOSITIONS THEREFOR

This invention was made with government support under Contract No. DE-FC22-83FE60149 awarded by the Department of Energy. The government has certain rights in this invention.

TECHNICAL FIELD

The invention relates generally to microbial enhanced oil recovery, and more specifically, to a method of increasing efficiency in microbial enhanced waterflood oil recovery operations.

BACKGROUND OF THE INVENTION

Waterflood oil production is a secondary method of oil production which employs injection wells and production wells spaced in such a manner that water, or other suitable fluid, can be injected into the injection wells, and pressure therefrom will drive oil to the production wells. Eventually, waterflooding progresses to a point where the efficiency of oil recovery no longer is advantageous. Nevertheless, the oil-bearing formation contains in its pores a substantial amount of oil at residual oil saturation concentration. A portion of this residual oil can be displaced by microorganisms in a tertiary oil recovery method known as microbial enhanced oil recovery (MEOR). Such use of microorganisms for recovery of oil is disclosed, for example, by Zobell, U.S. Pat. No. 2,641,566, which teaches treating an oil-containing formation with hydrogenase-producing bacteria and recovering displaced oil by waterflooding. Using microorganisms for this purpose, said organisms are introduced with nutrients into the production wells and the wells are shut in for a period to allow metabolism to occur. It is known that the products of the microbes, metabolism cause some of the residual oil in the area of the microorganisms to be displaced from the pores of the oil-containing formation. This displaced oil can be recovered from the production wells by resuming the waterflood.

McInerney, U.S. Pat. No. 4,522,261, discloses the use of a strain of *Bacillus licheniformis* for MEOR. *Bacillus licheniformis* produces a biosurfactant which is useful for mobilizing oil. The surfactant also is disclosed to be useful when directly injected into the reservoir in a partially purified form from spent *B. licheniformis* nutrient media. This direct injection of the microbial product eliminates the need to inject microbes in order to increase tertiary oil recovery.

Plugging of the reservoir by microorganisms is a recognized problem. The prior art methods do not provide a simple and inexpensive method for injecting microorganisms in an injection well, such that reservoir plugging is avoided. Rather, microbes are commonly injected into production wells so that the probability of plugging the reservoir is remote; or they may be injected into an injection well, in the presence of an agent intended to prevent microbial-induced plugging of the reservoir. Pursuant to the latter method, Clark, U.S. Pat. No. 4,610,302 discloses injection of a sacrificial agent near the injection well in order to occupy the adsorptive binding sites of the reservoir rock which otherwise would bind microorganisms and cause severe plugging of the reservoir near the injection site. The sacrificial agent allows more of the reservoir matrix to be covered by injected microbes with minimal plugging. Alternatively, as noted, microbes can be injected at the site of the production wells; but this option inherently limits the volume of the formation that can be treated and, so, the amount of oil that can be mobilized.

Another related problem is that of ensuring survivability of microbes in the oil-bearing formation. First, certain microbes simply may not grow well in an oil-bearing rock formation. Second, even if microbes are potentially able to grow there, often, indigenous species can outcompete the injected species for nutrients, and thus inhibit survival of the injected species. Moreover, the problem of survivability is complicated when the use of more than one species of microorganism is desirable, in that the distinct species must be compatible with each other to ensure survivability of each species.

It would be desirable to provide an inexpensive method for microbial enhanced oil recovery using a combination of species of microbes that can be injected directly into an injection well without a sacrificial agent, such that the microbes mobilize oil, but do not plug the pores of the reservoir rock. Further, it would be desirable to provide a method for deriving a microbial formulation that survives well in an oil-bearing reservoir; efficiently displaces oil present at residual-oil-saturation concentration, without plugging the reservoir; and is not adversely affected by microbial species indigenous to the reservoir.

SUMMARY OF THE INVENTION

In one of its aspects, the invention is a method of microbial enhanced oil recovery comprising injecting microorganisms directly into an injection well, in the presence of only a nutrient solution. In another of its aspects, the present invention is a method for selecting an optimized formulation or combination of microorganisms for producing oil from oil-bearing reservoirs. In this latter aspect, the method involves empirically developing a microbial formulation for use in increasing the amount of oil produced from a reservoir, by testing individual microorganisms and combinations thereof for survivability and efficiency in mobilizing residual oil under simulated reservoir conditions, and for actual survivability in situ in a single well of the reservoir of interest. The optimal microbial formulation will grow well under reservoir conditions and efficiently mobilize residual oil. The microbial formulations of the invention is comprised of a first species which secretes surfactant and a second species that secretes a solvent, such as an alcohol, ketone or acid.

In a further of its aspects, the invention is a method of injecting the microorganisms of a microbial formulation in a predetermined order, so that relatively more motile species are injected subsequent to less motile ones. This has been found to provide an efficient displacement of oil.

DETAILED DESCRIPTION OF THE INVENTION

The present invention, in one of its aspects, is a method of achieving improved oil recovery in a microbial-enhanced waterflood recovery system, by using a microbial formulation which can be effectively injected into an injection well, and which consists essentially of microorganisms of one or more species and a nutrient medium for said microorganisms. The formulations employed in accordance with the invention do not include sacrificial agent, other than that which might be produced by the microorganisms employed in the formulation, and yet do not plug the reservoir rock. The formulation is selected for its ability to mobilize oil from a specific reservoir. This is accomplished using a novel, empirical method for achieving from the microbial formulation twin goals of biocompatibility (i.e. survivability) in the reservoir environment and efficiency in mobilizing residual oil therefrom. The first of the twin goals is met, in part, by growing the microorganisms in culture under simulated in situ reservoir conditions. That is, the cells are cultured in vitro, under reservoir temperatures and pressures, in a growth medium containing reservoir brine and crude oil, and selected for hardy growth under those conditions. In vitro biocompatibility of individual species of microorganisms is thereby determined. The second goal, efficiency of oil mobilization, is acheived by selecting biocompatible species of microorganisms according to their ability to free residual oil in laboratory models simulating oil-bearing rock formations, without requiring an increase in injectivity pressures.

Promising species which meet both of said goals are combined and the combinations of species are tested, again for biocompatibility (i.e., with each other) and for efficiency of oil mobilization. Microbial formulations may contain several distinct species. The precise formulation is determined empirically, however. The process of formulating the most desirable combination of species for a particular well may be terminated when the addition of a further species fails to benefit survivability or efficiency of oil displacement.

Then the formulation is tested for survivability in the presence of species of microorganisms indigenous to petroleum reservoirs. The microbial formulation should not be adversely affected by indigenous species, and preferably should be able to overgrow such indigenous species, under reservoir conditions.

After in vitro biocompatibility and oil-mobilizing efficiency have been determined for the formulations, the microbial formulation is injected in the presence of nutrients (e.g., molasses) into a single injection well of the reservoir. The well is shut in, and the cells are allowed to acclimate to reservoir environment for between about one and about twenty weeks. The reservoir is then backwashed and aliquots of the backwash are sampled to determine in situ survivability of each of the species. An optimized formulation exhibiting good survivability for each of the species of the formulation is used for MEOR.

As used herein the term "microbial formulation" means a combination of microorganisms useful for displacing oil from a reservoir rock formation in waterflood microbial enhanced oil recovery.

As used herein the term "microorganism" encompasses bacteria and fungi.

By term "waterflood residual oil saturation" is meant the concentration of crude oil remaining in an oil-bearing formation after exhaustive waterflooding.

"Shutting-in" is the procedure by which injection water pressure of an injection well is reduced so that fluid ceases to flow from said well.

"Reservoir fluids" as used herein refers to reservoir crude oil and reservoir brine or a chemically-defined saline solution that is characteristic of reservoir brine.

"Nutrient composition" means a composition capable of sustaining growth of the microorganisms of a microbial formulation, said composition being substantially devoid of agents that have a high binding capacity for reservoir rock sites which have a high binding affinity for microorganisms.

The term "surfactant" as used herein means microbially produced surface-active agents, including, but not limited to, glycolipids (e.g. sophorose lipid or rhamnose lipid), lipoproteins, polysaccharide-fatty acid complexes, mono- and diglycerides, lipoheteropolysaccharides, peptidolipids, neutral lipids, corynomycolic acids, trehalose dimycolates and polysaccharide-protein complexes.

As used herein, the term "solvent" means microbially produced lower-chained alcohols, ketones and acids, including, but not limited to, methanol, ethanol, butanol, acetone, formic acid, acetic acid and butyric acid.

In one of its aspects, the invention is a method for performing microbial enhanced oil recovery by (a) introducing into an injection well of a reservoir substantially only a microbial formulation comprising a first species of microorganism which secretes a surfactant and a second species of microorganism which secretes a solvent from the group consisting of alcohols, ketones and acids, and a nutrient composition which consists essentially of an aqueous solution of nutrients capable of supporting growth of the microorganisms of said formulation, the species of microorganisms in said formulation being capable, upon incubation after injection with a nutrient into said reservoir, of surviving in said reservoir and said formulation being capable of displacing oil present at a concentration not substantially greater than waterflood residual oil saturation;

(b) shutting-in said injection well for an amount of time sufficient for the species of microorganisms of said microbial formulation to acclimate to said reservoir; and (c) after step (b) injecting a fluid into said injection well to drive said displaced oil to said production well.

In another of its aspects, the invention is a method for determining species of microorganisms to be included in a microbial formulation useful for microbial enhanced oil recovery from an oil-containing reservoir comprising the steps of:

(a) selecting a species of microorganism, said species capable of producing at least one product from the group consisting of: surfactant, alcohol, ketone, fatty acid and carbon dioxide;

(b) determining that said species selected according to step (a) is capable of growth in a medium comprising nutrients and reservoir fluids from said reservoir; and (c) determining that a culture of said species is capable of displacing oil from oil-bearing rock of said reservoir.

In another of its aspects the invention is a method for determining a combination of microorganisms for use in microbial enhanced oil recovery comprising the steps of:

(a) combining at least two species identified according to the immediately preceding method for selecting individual species;
(b) determining that said species of said combination are capable of growth in each other's presence in a medium comprising nutrients and reservoir fluids from said reservoir; and
(c) determining that said combination is capable of displacing oil from oil-bearing rock of said reservoir, said oil present at a concentration not greater than about waterflood residual oil saturation.

In a further of its aspects, the invention is a method of injecting the microbial formulation into the injection well of a reservoir which comprises injecting seriatim substantially pure cultures of the species of microorganisms in said formulation, with the order of injection being more motile species injected after less motile species.

The present invention can be practiced in any oil-bearing reservoir having an oil concentration at least about that of residual oil saturation after waterflooding, and which has physical and chemical characteristics suitable for microbial life. In general, the reservoir fluids should have a temperature less than about 160° C., a pressure less than about 4000 psig, a pH between about pH 5 and pH 9 and a salt concentration less than about 10%. Tables I and II (below) show results from the testing of a suitable oil field for producing oil according to the method of this invention. Although the invention is described with reference to waterflood MEOR, the methods of the invention also may be employed to enhance primary oil production or to incease oil production from oil fields not utilizing fluid injection techniques, such as from single wells known in the art as stripper wells.

In the present invention, as it pertains to methods for selecting microorganisms to be used in microbial enhanced oil recovery, the microorganisms under consideration will generally be those that will grow in an oxygen-limited environment. Thus, in general, anaerobes (faculative or strict) are preferred. In addition, the microorganisms preferably produce a surfactant or solvent in the course of their metabolism under conditions in the reservoir in which they are employed in MEOR. Other beneficial microbial products are fatty acids, carbon dioxide and methane.

In formulating the microbial combinations of the invention, in vitro survivability studies are generally conducted first with each species under consideration to determine which microorganisms can grow under simulated reservoir conditions and preferably overgrow species indigenous to the reservoir. Bacillus species which produce surfactant and Clostridium species which produce solvents and/or surfactants have good potential for use in a microbial formulation according to the invention. Especially desirable is a combination containing a *Bacillus licheniformis* and a Clostridium species which produces alcohol and/or ketone. Other genera besides Bacillus and Clostridium may be employed in keeping with the teaching of this specification including Acinetobacter, Arthrobacter, Candida, Corynebacterium, Nocardia, Pseudomonas, Rhodococcus, and Toruloosis, which have been shown to produce surfactants; and Acetobacter, Arthrobacter, Bifidobacterium, Corynebacterium, Gluconobacter, Lactobacillus, Leuconostoc, Pediococcus, Pseudomonas, Ruminobacter, Ruminococcus, Sporolactobacillus, Streptococcus and Zymomonas, which genera have been shown to produce solvents. Microorganisms useful in the present invention may be obtained from culture collections, such as the American Type Culture Collection, Rockville, Md., which make cultures available to the public. Moreover, microorganisms may be isolated, as known in the art, from several sources including, oil-saturated soil, oilfield brines, and other fuel-saturated waters.

Survivability Screening

Stock cultures of microbes are grown and maintained in trypticase soy broth, as well known in the art.

Survivability studies entail growing the microorganisms in nutrient medium containing reservoir fluids (brine and crude oil) and selecting those species which survive best. Brine/nutrient solution is made (e.g. 4% molasses in reservoir brine), crushed rock from the reservoir, powdered with a mortar and pestle, is added to about 10%, by volume. A layer of crude oil from the reservoir is layered on top (0.1-1.0 ml oil/5 ml of brine/nutrient) and 0.1-5.0 ml of the microorganisms at $10^6$-$10^8$ cells/ml are added and grown in the oil- and rock-containing nutrient/brine. The molasses and other components are not sterilized before addition. The cells are allowed to grow in this medium for 3-10 days at 25°-50° C., preferably about 37° C. Survivability is determined by comparing the number of viable cells/ml before and after incubation. Species which show at least as many viable cells present after incubation in brine/nutrient as were inoculated are considered to have exhibited good survivability and are further tested in sandstone cores under simulated reservoir conditions, as described below, for oil recovery efficiency.

Oil Recovery Efficiency

Oil recovery efficiency is assessed in waterflooded sandstone cores and in waterflooded etched glass "micromodels" as described by I. Chatzis, New Mexico Petroleum Recovery Research Center, New Mexico Institute of Mining and Technology, PPRC Report No. 82-12, (Mar. 1, 1982); Bryant, R. S., and Douglas, J., Society of Petroleum Engineers, paper 16274 (1987).

Sandstone cores are prepared as follows: Blocks of Berea sandstone (obtained from Cleveland Quarries (Amherst, Ohio)), or reservoir rock obtained from the oil-bearing reservoir of interest, are cut into cylindrical cores of 10-50 cm, preferably about 25 cm in length and 1-10 cm, preferably about 3.7 cm in diameter. The pore volumes (hereinafter "PV") of the Berea sandstone cores with length of 25 cm and diameter of 3.7 cm ranges from about 53 to 57 cc. The cores are fired at 800° F. for 24 hours to stabilize the clays. Cores are then either encapsulated in epoxy or encased in rubber sleeves and placed inside stainless steel Hassler coreholders, as known in the art. Inlet and outlet valves are attached to the ends of the cores. The cores are then evacuated for 2 to 3 hours and flushed with reservoir brine or an equivalent preparation. The absolute permeability of each core is calculated applying Darcy's law. In general, only cores showing permeability of at least about 100 millidarcies are used. "Residual water saturation" is established for a core by injecting crude oil until no additional water is produced. Once residual water saturation is established, the cores are brine flooded to residual crude oil saturation, i.e., until no additional oil is produced. This simulates a waterflooded, residual-oil-saturation condition.

Microbial species are injected at a concentration of between about $1 \times 10^6$ and about $1 \times 10^8$ cells/ml. 0.2 PV of microbes and 0.3 PV of sterile 1.5% sucrose, 0.1% ammonium chloride, pH 6.5 (sucrose nutrient medium) or 4% molasses (made with brine) are injected. The cores are incubated at 37° C. for 1 to 2 weeks. The cores are then waterflooded at a rate of 1-2 ft/day. During the waterflood, fractions of the core effluent are collected and the amount of oil recovered and the water-oil ratio is determined.

The capacity of the microbial formulation to displace residual oil without plugging the reservoir rock is shown by efficiencies of oil recovery of at least about 20%, and preferably at least about 40%, with substantially no increase in the core pressure necessary to maintain a given flow rate (e.g., 2 ft./day). Oil recovery efficiency, $E_r$, measured as a percentage of pore volume (PV) of a test core, is calculated according to the following equation:

$$E_r = \frac{(S_{orwf} - S_{orcf})}{S_{orwf}} \times 100\%$$

where $S_{orwf}$ = residual oil saturation after waterflood and $S_{orcf}$ = residual oil saturation after microbial treatment.

Survivability of the microbes is also determined: The effluent is examined microscopically, and plate counts are done on aliquots of the effluent.

Long term survivability and oil mobilization studies are carried out in essentially the same way, except the cores are incubated at lower temperature (15° C.–30° C., preferably about 25° C.) for 16–28 weeks. Control cores are run without added microbes.

Micromodels are prepared as described by Chatzis, supra. Micromodel studies may be carried out simultaneously with the core flood to determine whether the microbial formulation mobilizes oil in the simulated porous media. Glass micromodels are saturated with brine from the reservoir and flooded with crude oil from reservoir. The micromodel is then flooded with injection water until no more oil movement is obtained (residual oil saturation). A microbial formulation having a final cell concentration of between about $1 \times 10^6$ and about $1 \times 10^8$ cells/ml is flushed through the micromodel until cell saturation is reached, and then shut in at 15° C.–30° C., preferably about room temperature, for 3 days. The micromodel is then waterflooded and videotaped using video-enhanced microscopy. Desirably, some gas bubbles may be produced during incubation of the micromodel. If the microbial formulation is efficient, when the micromodel is waterflooded, there should be a large amount of oil mobilization. There is generally a high degree of correlation between oil recovery data from the micromodel and core-flooding systems.

Based on the oil mobilization results for individual species, different combinations of microorganisms are selected and tested under simulated reservoir conditions, as described above, for compatibility of growth in each other's presence. Total cell concentration (equal number of each species) is $10^6$–$10^8$/ml. The combinations that are found to be compatible in culture are tested, again using core flooding and/or micromodels, as just described, to find which combinations are best able to mobilize residual oil.

Although combinations of microbes may be selected in the first instance for their secretion of surfactant, in addition, good gas-, solvent-, and acid-producers are very desirable. Thus, for example, a microbial formulation which generates a combination of surfactant, alcohol, acid and/or gas would tend to provide potential for a high efficiency of oil mobilization.

It has been found that microbial formulations having one species which shows relatively hardier growth under reservoir conditions than the other(s) in the same formulation can beneficially influence the survivability of the formulation as a whole. Such hardy species typically will consistently have higher numbers of viable cells after incubation, despite the fact that equal ratios of the species of the formulation were injected. This phenomenon supports the establishment of a stable population. Thus, it may be desirable to include in a microbial formulation a species which grows well in reservoir fluids (but is only moderately efficient at displacing oil) along with one or more species that are efficient oil mobilizers (but not as hardy under reservoir conditions). Such microbial formulations, because they comprise a hardy species, tend advantageously to outcompete microbes indigenous to the reservoir. Such indigenous microbes, at best, are not very efficient at mobilizing residual oil, and at worst, may produce environmentally harmful compounds (e.g. $H_2S$).

Although it is preferred that the microorganisms are chosen and tested singly, first, and then in pairs or combinations of more than two, combinations of microorganisms may be tested in the initial screening process.

Formulating a microbial combination may be terminated when adding a further species to the microbial formulation fails to beneficially increase oil recovery or survivability.

Survivability of the Microbial Formulation in the Presence of Indigenous Microorganisms A microbial formulation is assessed for survivability of its constituent microorganisms in the presence of microorganisms that are indigenous to petroleum reservoirs, after the formulation has been optimized for survivability of its constituent microorganisms among themselves under model oil reservoir conditions and for oil recovery efficiency.

Microorganisms are isolated from the produced waters of the petroleum reservoir of interest. The inventors have found that, of the most common indigenous species from several reservoirs, about 50% of the isolates were Bacillus species, and about 30% gram negative rods. 85% of the isolates from the reservoirs could ferment sucrose and/or grow in 5% sodium chloride. Many of the Bacillus species were Beta-hemolytic using sheep red blood cells.

The indigenous microorganisms are cultured in pairs in anaerobic tubes of trypticase soy broth for 48 hours with or without crude oil and crushed sandstone rock and examined for (1) ratio of the numbers of organisms of each species of the pair, (2) endospore formation, and (3) whether the addition of crude oil and Berea sandstone rock alters the ratio of the numbers of organisms of each of the species. With certain pairs of bacteria, multiplication occurs in essentially a 1:1 ratio, while, with other pairs, one species will overgrow the other.

Several pairs of indigenous species may be selected using the above parameters and used to "challenge" the survivability of the microbial formulation of the invention. Survivability of the constituent microorganisms of a microbial formulation in the presence of indigenous microorganisms is tested as follows:

Berea sandstone cores are prepared, as described above, to effect waterflood residual oil saturation. 0.5 PV of a culture of a pair of indigenous species (about $10^6$ cells/ml of each species, in approximately a 1:1 ratio) are injected in trypticase soy broth and incubated at 37° C. for one week. A sample of the effluent from the cores is examined microscopically and plate-counted to assess viability. 0.5 PV of the microbial formulation ($\sim 1 \times 10^6$ cells/ml and 4% molasses are injected and the core is incubated at 37° C. for one week. Cores are then waterflooded and effluents are again plate-counted and microscopically examined. Microbial counts should be about $10^4$ cells/ml or more, with microscopic examination of the effluent showing each cell type.

Once a microbial formulation is optimized in the laboratory as described above, it is tested in situ in a single injection well of the reservoir of interest. The microbial formulation is injected into said well with a nutrient solution and the well is shut in to allow the microorganisms to acclimate. After a period of one or more weeks the well is opened and backwashed and aliquots of the backwash are tested for survivability of the microbial formulation. A laboratory-optimized formulation, the organisms of which survive under in situ reservoir conditions, is used for microbial enhanced oil recovery.

The microbial formulation must be injected in the presence of nutrients. Molasses is the preferred nutrient and should be injected in amounts sufficient to yield a molasses concentration in the vicinity of the microbial formulation of between about 1% and 10%, preferably about 4%, by weight. Liquid molasses from the Pacific Molasses Co., (Oklahoma City, Okla.) has been found to provide the best results. The microbial formulation may be injected as a mixed culture of each of its constituent species in a single slug, but preferably the formulation is injected as a series of substantially pure cultures. Pads of molasses preferably are injected before slugs of microbes, in any event, and if multiple slugs of microbes are injected, between each slug. Although molasses is preferred, any feedstock material, such as corn syrup, or waste products from processing feedstock material, may be used.

After the injections, the reservoir preferably is shut in for a period of one or more weeks to permit the microorganisms to acclimate to reservoir conditions. Once waterflooding is resumed, a regular schedule of feeding preferably is carried out (e.g., daily injections of molasses) to ensure delivery of adequate nutrients to the microbes.

The microbial formulation may be injected using a bypass header that is valved into the injection water system. Such a bypass header delivers the microbial formulation to the reservoir more efficiently than would simply pouring said formulation into the injection well.

In another of its aspects, the invention involves a method for administering through a well (preferably an injection well) into an oil reservoir constituent microorganisms of a microbial formulation for MEOR from said reservoir, which comprises administering said microorganisms to said reservoir in the order which is opposite the ranking of said microorganisms according to motility through water. Motility is simply observed by microscopic examination of the microbes on a wet mount, and the microorganisms are ranked according to relative rate of movement. In this aspect of the invention, the least motile is administered first, the second from least motile administered second, and so on, until the most motile is administered last. The inventor has found this order of injection to be especially effective in in situ microbial enhanced oil recovery, as microorganisms have different rates of transport (i.e., motility) through rock formations in a reservoir. Preferably, after the species are first injected as individual, substantially pure cultures, in reverse order of their motility, a final microbial slug containing all of the species is injected. Although a single injection of the mixture of the species may be used, this preferred method of administering microorganisms to a reservoir facilitates a wide distribution of the microorganisms, which in turn provides an increased oil recovery efficiency.

Using the method of the invention, the inventor is the first to show that, surprisingly, a microbial formulation can be injected into an injection well of an oil-bearing formation, in the presence of a culture medium consisting essentially of nutrients (i.e., substantially free of sacrificial agents) to significantly increase oil production, without plugging said formation; and more surprisingly, the microorganisms may be transported through the rock formation of a reservoir, from the site of an injection well to the site of a production well.

Microbial formations will preferably comprise at least one species that produces a surfactant and at least one that produces an alcohol, ketone or acid. The most preferred formulation comprises *Bacillus licheniformis* (ATCC #39307) and a Clostridium species designated NIPER #6 (ATCC #53798), which was isolated at the National Institute of Petroleum and Energy Research (NIPER). This formulation is believed to be superior to the formulation of Table IV below, which provided a suprisingly good efficiency of oil recovery in situ. as set forth in the Example below. Also preferred is a formulation which comprises *Bacillus licheniformis* (ATCC #39307) and a Clostridium species designated NIPER #3 (ATCC #53797).

EXAMPLE

Figure 1:
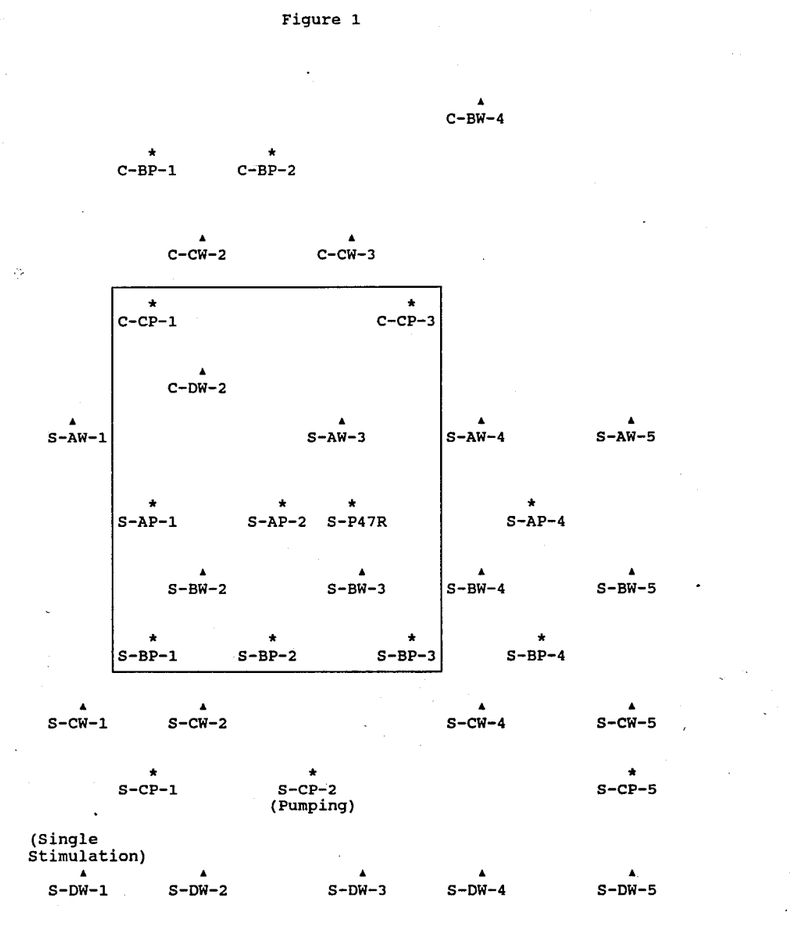
FIG. 1 is a map view depicting the production wells and injection wells on a site known as the Mink Unit, located in the Delaware-Childers Field (Sec. 36, TWP, 27N, RGE. 16E), in northeastern Oklahoma. The bounded area indicates that portion of the Mink Unit where oil production was increased, by waterflood microbial enhanced oil recovery using the methods disclosed herein. The symbol   denotes an injection well, and the symbol * denotes a production well.

A microbial-enhanced waterflood field experiment was conducted in Nowata County, Oklahoma, on a site known as the Mink Unit, located in the Delaware-Childers Field (Section 36, Township 27N, Range 16E). The Mink Unit is producing oil from the Bartlesville Sandstone Formation, using waterflooding. The Mink Unit covers 160 acres, of which 110 acres are productive, and contains 21 injection wells and 15 producing wells drilled on a 5-acre spacing (see FIG. 1). Only one of the producing wells was being pumped. Well completions were open hole. Average reservoir properties are listed in Table I. The site within the Mink Unit for conducting microbial enhanced waterflood oil recovery, covered an area of 17.8 acres and a net pay volume of 516 ac-ft. and had four injection and 8 production wells (the boundaries of which are depicted in FIG. 1).

TABLE I

| Average Reservoir Properties for Mink Unit | |
|---|---|
| Formation | Bartlesville Sandstone |

TABLE I-continued

Average Reservoir Properties for Mink Unit

| | |
|---|---|
| Depth, ft | 600 |
| Net Pay Thickness, ft | 30 |
| Permeability, md | 60 |
| Porosity, percent | 20 |
| Formation Temperature, °F. | 65 |
| Number of Injection Wells | 21 |
| Average Water Injection Rate, bbl/day | 40 per well |
| Injection Pressure, psi | 530 |
| Average Oil Production Rate, bbl/day | 6.4 |
| Oil Gravity, API | 34 |
| Oil Viscosity, cp @ 77° F. | 7 |

Initially, field sampling was conducted to establish baseline readings in the Mink Unit for total oil production, and total water production; injection well pressures and fluid rates from each well, and production well fluid rates and water/oil ratios from each well. Samples of produced fluids were collected each week and analyzed. Total dissolved solids (TDS), pH, trace mineral and ion analysis, and microbial populations (including sulfate reducing bacteria), and oil viscosity were determined for each sample. The baseline data are provided in Table II. The TDS of the produced water from each producer and the injection plant water remained constant to within ±0.01%. The pH of the samples remained between pH 6.4 and pH 7.0, and trace minerals and ion analysis indicated no marked changes in concentration of sodium, calcium, magnesium, strontium, barium, carbonate, hydroxide, and phosphate. The microbial counts from the producing wells were consistent throughout the monitoring period as shown in Table III. The counts were very low, and ranged from 0 to 100 colony-forming units per milliliter of water in the producing wells. Sulfate reducing bacteria were consistently present at low levels in the tank battery water and intermittently present in the plant injection water. There were sporadic occurrences of sulfate-reducing bacteria in the produced waters. The field data during the base line monitoring period remained consistent.

TABLE II

TDS, pH, and Trace Mineral Analyses from Mink Unit Field Water Sample

| Well | TDS, % Baseline Average | pH Baseline Average |
|---|---|---|
| CBP2 | 0.66 ± .02 | 6.63 ± .28 |
| CCP1 | 1.08 ± .05 | 6.61 ± .30 |
| CCP3 | 1.12 ± .01 | 6.54 ± .18 |
| SAP1 | 0.66 ± .03 | 6.63 ± .16 |
| SAP2 | 1.06 ± .10 | 6.54 ± .27 |
| SP47R | 0.28 ± .03 | 6.53 ± .11 |
| SBP1 | 0.48 ± .03 | 6.66 ± .18 |
| SBP2 | 0.55 ± .11 | 6.56 ± .22 |
| SBP3 | 0.48 ± .02 | 6.65 ± .30 |
| SAP4 | 0.73 ± .03 | 6.55 ± .14 |
| PLANT | 0.03 ± .00 | 6.65 ± .34 |
| T.B. | 0.50 ± .03 | 7.40 ± .15 |

| Cation | Plant mg/l | Tank Battery mg/l | Well SAP2 mg/l |
|---|---|---|---|
| Sodium | 12 | 1,183 | 3,176 |
| Calcium | 34 | 156 | 330 |
| Magnesium | 53 | 289 | 217 |
| Strontium | 0.4 | 30 | 20 |
| Barium | 0.2 | 134 | 144 |
| Potassium | 4.5 | 8.7 | 14 |
| Iron | 0.7 | 5 | 2 |
| Copper | <0.1 | <0.5 | <0.5 |
| Zinc | <0.1 | <0.5 | <0.5 |
| Nickel | <0.1 | <0.1 | <0.5 |

TABLE II-continued

TDS, pH, and Trace Mineral Analyses from Mink Unit Field Water Sample

| | | | |
|---|---|---|---|
| Chloride | 17 | 2,037 | 5,294 |
| Sulfate | 15 | 12 | 12 |
| Bicarbonate | 135 | 1,450 | 1,800 |
| Carbonate | 0 | 0 | 0 |
| Hydroxide | 0 | 0 | 0 |
| Phosphate | <0.5 | <2 | <2 |

TABLE III

Baseline Microbial Counts

| | cfu/ml[1] |
|---|---|
| *Aerobic Plate Counts* | |
| Injection water average | 3,000–5,000 |
| Produced water average | 0–100 |
| Tank battery water average | 300–500 |
| *Anaerobic Plate Counts* | |
| Injection water average | 100–300 |
| Produced water average | 0–10 |
| Tank battery water average | 5–50 |

[1]cfu/ml = colony-forming units per milliliter of water.

Laboratory Design of the Microbial System

Several different microbial formulations were grown in 4% molasses Pacific Molasses Co., (Oklahoma City, Okla.) and Mink Unit reservoir fluids (i.e., brine and crude oil). The cultures were grown under temperature and pressure conditions that simulated those of the reservoir. The microbes that grew best under these conditions were then cultured in mixed cultures to confirm that they grew well with each other under reservoir conditions. The mixed culture was further submitted to compatibility tests with nutrients and reservoir brine and oil to determine if the culture would overgrow indigenous microorganisms isolated from reservoir brine. Microscopic observation and plate counts were used to determine the ability of the microbial formulation to overgrow indigenous species.

The microorganisms that were selected as a mixed culture were then examined for their ability to recover residually trapped crude oil from Berea sandstone cores.

In the micromodel studies, the micromodel was saturated with brine from the Mink Unit tank battery and flooded with crude oil from the Mink Unit. The micromodel was then flooded with plant injection water until no more oil movement was obtained (residual oil saturation). The bacterial formulation of Table IV was injected into the micromodel, shut in at room temperature for three days, and then the micromodel was waterflooded and video-taped, using a video enhanced microscopy apparatus. It was observed that there were some gas bubbles produced during incubation of the micromodel, and when the micromodel was waterflooded, there was a large amount of oil mobilization (approximately 60% of the oil concentration in the micromodels).

The formulation of Table IV, which is made up of microorganisms producing primarily surfactants, acids, and alcohols, was selected for the field test. This microbial formulation recovered 28% of the residual oil remaining in representative cores from the Delaware-Childers Field after waterflooding.

TABLE IV

Composition of the Microbial Formulation Derived for the Mink Unit

| Scientific Name | Aerobic of Anaerobic | Microbial products |
|---|---|---|
| 1. *Clostridium* sp[1] | Anaerobic | Gases, alcohols, acids, surfactants |
| 2. *Bacillus*[2] licheniformis | Facultative | Surfactant, acids |
| 3. *Bacillus*[3] | Facultative | Surfactant, acids |
| 4. Gram-negative[4] rod | Facultative | Gases, acids |

Aerobic - oxygen-requiring.
Anaerobic - non-oxygen requiring.
Facultative - can grow with or without oxygen.
[1] NIPER #3: Isolated at National Institute of Petroleum and Energy Research (NIPER)
[2] American Type Culture Collection Accession No. 39307
[3] Isolated at NIPER
[4] Isolated at NIPER

Evaluation of Project Performance

Tracer Studies

Chemical tracer studies were conducted, prior to injecting any microbes, to determine the flow patterns of the injected fluids in the Mink Unit. Fluorescein was found to be compatible with the formation fluids, as well as with the microbial cultures, and was chosen as the tracer for the test. Twenty-seven barrels of aqueous fluorescein, at a concentration of 174 ppm, was injected into wells S-BW-2 and S-BW-3 respectively. Approximately two months later, 5.2 barrels of 302 ppm fluorescein was injected into wells C-DW-2 and 5.2 barrels of 210 ppm fluorescein was injected into well S-AW-3. Sampling of each producing well was conducted daily for the first five days after tracer injection and then bi-weekly samples were taken for two months. Samples were protected from light from the time of sample collection to the time of the fluorescence assay. The fluorescein concentration curve was plotted against time for each producing well. These curves indicated that there did not appear to be gross channeling because the response persisted for a reasonable period of time. Every producing well showed a response from the injected fluorescein, which indicated that there was communication among all wells. The area under each curve was integrated, and a value was obtained. This value was divided by the average barrels of produced water for that well and the wells were ranked accordingly (See Table V). The tracer studies seemed to indicate a northeasterly flow pattern because the C-CP-1 and C-CP-3 wells, and the S-AP-4 well received fluorescein in greater amounts and more quickly than the other wells. The middle well, S-AP-2, received the highest amount of fluorescein, which was expected as this well is affected by the four injection wells. See FIG. 1.

TABLE V

Fluorescein Results

| Well | Area of Integrated Curve, cm$^2$ | Ratio[1] | Avg. total fluid product. bbl/day | Rank |
|---|---|---|---|---|
| CBP2 | 6.07 | .036 | 169 | 10 |
| CCP1 | 5.38 | .125 | 43 | 5 |
| CCP3 | 12.0 | .21 | 56 | 3 |
| SAP1 | 15.87 | .209 | 76 | 4 |
| SAP2 | 7.45 | .276 | 27 | 1 |
| SP47R | 11.73 | .06 | 193 | 7 |
| SAP4 | 9.37 | .218 | 43 | 2 |
| SBP1 | 7.73 | .046 | 168 | 8 |
| SBP2 | 4.42 | .038 | 115 | 9 |
| SBF3 | 2.35 | .065 | 36 | 6 |

[1] Ratio = Area of curve/avg bbl fluid produced.

Injection of the Microbial System and Nutrient

Twenty-six gallons of the microbial formulation of Table IV was injected into each of the four injection wells. Wells C-DW-2 and S-BW-2 were injected on the same day; and wells S-AW-3 and S-BW-3 were injected four days later. See FIG. 1. Ten gallons of pure molasses (approximate concentration in the well of 4%) was injected into each well before and after the microbial formulation. The four treated injection wells were shut in for fifteen days (C-DW-2 and S-BW-2) or eleven days (S-AW-3 and S-BW-3), although the seventeen other injection wells on the Mink Unit were still in operation. After water injection was resumed, the injection wells were backflushed to determine if microbial activity could be observed. All wells produced foam, indicating a large among of surfactant production, and that the microbial populations were viable. The four injection wells were then injected daily with two gallons of pure molasses, per well per day, to sustain growth of the injected microorganisms, the molasses being injected by means of a header bypass system.

Sampling Procedures and Results

Sampling of the producing wells was carried out on a weekly basis. Samples were collected from a flowing stream in sterile 4 oz. glass bottles. Each bottle was filled completely and tightly capped. The samples were taken to the laboratories and processed immediately. The parameters monitored after microbial injection are given in Table 6.

Tables VII-VIII show the surface tension and oil viscosity average for the baseline and post-microbial treatment period for each producing well. These properties were measured to determine if products from the microorganisms had reached the producing wells. Clearly the surface tension was reduced by the injection of the microbial formulation, although the amount of reduction was not sufficient alone to increase oil recovery. The wells were ranked for surface tension reduction, with 1 indicating the well with the greatest reduction when compared to the baseline value. Oil viscosities appeared to have increased slightly in some wells after the injection, while in others it appeared to have decreased. The wells were ranked, with the number 1 well being the one that showed the greatest change in oil viscosity from the baseline average.

Table IX illustrates that rank for each producing well when the rankings were averaged. It will be noted that the well closest to the injectors, S-P47R, ranked number 1 while the well in the middle of all of the injectors, S-AP-2, ranked number 2. The northern tier wells, C-CP-1 and C-CP-3 are ranked very closely to one another, while the southern tier wells, S-BP-1 and S-BP-2 are also ranked very closely to each other. The well ranked number 1, S-P47R, was the closest well in spacing to the injector wells, averaging only 215 ft. therefrom. This well was the first to show results from the microbial treatment, as expected. It is interesting to note, as a general trend, the fluorescein and microbial rankings were fairly close for each well, even though fluorescein appeared a few days after the injection and the microorganisms did not appear in high concentration until 30 weeks after injection. One of the injected microorganisms, *Bacillus licheniformis*, was detected on trypticase soy agar plates of the produced water from wells S-AP-2, C-CP-1, and C-CP-3, approximately 30 weeks after injection. That *Bacillus licheniformis* was detected in the produced waters represents the first time that an injected microorganism has been known to be transported from an injection well to a producing well.

It is also interesting that laboratory monitoring results did not detect any molasses at any of the producing wells after 2½ months after the initial injection of microorganisms. This indicates that the microorganisms were metabolizing the molasses in the formation; the backflush results (given below in Table X) support this conclusion.

Injection pressures remained fairly constant after the microbial injection. Thus, there was no significant plugging.

TABLE VI

Monitored Parameters of Field Test

| Parameter | Sampling time | Wells Sampled |
|---|---|---|
| Total dissolved solids | Weekly | Each producer, plant water |
| pH | Weekly | Each producer, plant water |
| Surface tension | Weekly | Each producer, plant water |
| Oil Viscosity | Biweekly | Each producer |
| Interfacial tensions | Biweekly | Each producer |
| Aerobic and facultative microbial populations | Weekly | Each producer, plant water |
| Anaerobic microbial population | Weekly | Each producer, plant water |
| Sulfate-reducing bacterial population | Weekly | Each producer, plant water |
| Molasses concentration | Weekly | Each producer, plant water |
| Aerobic and facultative microbial populations | Monthly | Each (4) injection well |
| Surface tension | Monthly | Each (4) injection well |
| pH | Monthly | Each (4) injection well |
| Gas analysis | Every few months | Random producers |

TABLE VII

Surface Tension Values for Producing Wells

| Well | Surface Tensions dynes/cm Base | Post | Rank S.T. |
|---|---|---|---|
| CBP2 | 57 | 53.3 | 5 |
| CCP1 | 56.5 | 51.8 | 2 |
| CCP3 | 58.5 | 55.6 | 7 |
| SAP1 | 57 | 54.8 | 8 |
| SAP2 | 58 | 53.7 | 4 |
| SP47R | 58.6 | 53.1 | 1 |
| SAP4 | 58 | 56.6 | 9 |
| SBP1 | 57 | 53.9 | 6 |
| SBP2 | 57.5 | 53.0 | 3 |
| SBP3 | 58 | 57.2 | 10 |

TABLE VIII

Viscosity Values for Producing Wells

| Well | Crude Oil Viscosity at 77° F., cp Baseline | Post | Rank |
|---|---|---|---|
| CBP2 | 6.79 | 7.34 | 6 |
| CCP1 | 5.88 | 6.40 | 4 |
| CCP3 | 6.71 | 6.54 | 10 |
| SAP1 | 5.77 | 6.27 | 5 |
| SAP2 | 7.44 | 6.87 | 7 |
| SP47R | 7.5 | 9.36 | 1 |
| SAP4 | 8.11 | 8.40 | 9 |
| SBP1 | 6.43 | 7.21 | 2 |
| SBP2 | 6.23 | 6.80 | 3 |
| SBP3 | 6.92 | 7.22 | 8 |

TABLE IX

Total Ranking Values for Producing Wells, January 22, 1988

| Well | Viscosity | S.T. | WOR | Fluor | Micro. | Field | Avg. | Rank |
|---|---|---|---|---|---|---|---|---|
| SP47R | 1 | 1 | 1 | *7 | 5 | 1 | 2.7 | 1 |
| SAP2 | 7 | 4 | 5 | 1 | 1 | 2 | 3.7 | 2 |
| CCP3 | 10 | 7 | 2 | 3 | 2 | 5 | 4.8 | 3 |
| CCP1 | 4 | 2 | 8 | 5 | 4 | 7 | 5.0 | 4 |
| SBP1 | 2 | 6 | 3 | 8 | 8 | 6 | 5.5 | 5 |
| SBP2 | 3 | 3 | 10 | 9 | 6 | 3 | 6.2 | 6 |
| SAP1 | 5 | 8 | 7 | 4 | 9 | 4 | 6.2 | 7 |
| SAP4 | 9 | 9 | 6 | 2 | 3 | 9 | 6.2 | 8 |
| SBP3 | 8 | 10 | 4 | 6 | 7 | 8 | 7.0 | 9 |
| CBP2 | 6 | 5 | 9 | 10 | 10 | 10 | 7.8 | 10 |

*May have missed some fluorescein due to sampling times.
Viscosity = % change in crude oil viscosity, where 1 is highest % change.
S.T. = % change in surface tension from baseline avg., where 1 is highest.
WOR = % decrease in water/oil ration avg. of baseline and post, where 1 is highest.
Fluor = Area under curve of conc. vs. time/avg. total bbl fluid/day where 1 is highest ratio.
Micro. = Rank of 1st appearance of a microbial conc. of 3 logs greater.
Field = Rank according to influence of injection wells and distances.

Backflush Analyses

Samples were taken during the routine backflushing of the four injection wells approximately every four weeks to determine if the microorganisms were still viable in the near wellbore area. Table X shows the microbial counts, pH, and surface tension values of the backflush water from the injection wells. The microbial counts increased to over 10,000,000 within 7½ months after the initial injection of microbes. The surface tension values began to decrease during the same time that microbial counts increased, which indicated that the products of the microorganisms were responsible for lowering of surface tension and apparently moved ahead of the microorganisms to the producing wells, as the surface tension values for all of the production wells decreased.

TABLE X

Backflush Sampling Results

| Well | Aerobic cfu/ml | Anaerobic cfu/ml | Surf. tension dynes/cm | pH |
|---|---|---|---|---|
| | Sample 1–7 wk post injection | | | |
| SAW3 | $2.3 \times 10^3$ | $2.61 \times 10^4$ | 62 | 6.1 |
| SBW2 | $7.05 \times 10^2$ | $9.64 \times 10^3$ | 59 | 6.55 |
| SBW3 | $2.96 \times 10^3$ | $2.66 \times 10^4$ | 65 | 6.05 |
| CDW2 | $8.66 \times 10^2$ | $1.7 \times 10^4$ | 57.5 | 6.25 |
| | Sample 2–10 wk post injection | | | |
| SAW3 | $1.14 \times 10^4$ | $7.4 \times 10^3$ | 64 | 6.6 |
| SBW2 | $4.5 \times 10^3$ | $6.2 \times 10^3$ | 68.7 | 7.4 |
| SBW3 | $1.7 \times 10^3$ | $5.1 \times 10^3$ | 63.1 | 6.8 |
| CDW2 | $3.9 \times 10^3$ | $4.5 \times 10^3$ | 54.8 | 6.7 |

TABLE X-continued

Backflush Sampling Results

| Well | Aerobic cfu/ml | Anaerobic cfu/ml | Surf. tension dynes/cm | pH |
|---|---|---|---|---|
| SAW3 | $1.24 \times 10^3$ | $5.57 \times 10^4$ | 45 | 4.3 |
| *Sample 3—22 wk. post-injection* | | | | |
| SBW2 | $1.7 \times 10^2$ | $9.6 \times 10^3$ | 57 | 6.58 |
| SBW3 | $4.0 \times 10^2$ | $1.44 \times 10^4$ | 53.9 | 6.42 |
| CDW2 | $1.4 \times 10^3$ | $2.8 \times 10^4$ | 44.3 | 4.7 |
| *Sample 4—26 wk. post-injection* | | | | |
| SAW3 | $1.09 \times 10^7$ | $1.87 \times 10^7$ | 67.5 | 5.55 |
| SBW2 | $3.73 \times 10^6$ | $7.75 \times 10^6$ | 65 | 6.25 |
| SBW3 | $3.13 \times 10^6$ | $9.45 \times 10^6$ | 68.5 | 6.35 |
| CDW2 | $1.02 \times 10^7$ | $4.37 \times 10^7$ | 51.5 | 5.4 |
| *Sample 5—34 wk. post-injection* | | | | |
| SAW3 | $5.46 \times 10^7$ | $2.40 \times 10^7$ | 62.5 | 5.6 |
| SBW2 | $7.09 \times 10^7$ | $2.41 \times 10^7$ | 64 | 5.9 |
| SBW3 | $4.11 \times 10^8$ | $1.26 \times 10^7$ | 65 | 5.55 |
| CDW2 | $1.82 \times 10^7$ | $5.39 \times 10^7$ | 52 | 5.35 | cfu = colony forming units per milliliter

Oil Production

A comparison of the 1987 oil production data (post-microbial treatment) to the 1986 oil production data (baseline) showed an increase over the entire Mink Unit production area of approximately 13%. Only 4 of 21 injection wells were treated. Therefore, the potential increase was considerably greater. Table XI shows the average water-oil ratio (WOR) for each producing well at the end of the baseline period, as compared to the WOR one year after the first injection of the microbial formulation. In all cases the WOR has decreased for each producing well, and in some wells by more than 30%.

TABLE XI

Water/Oil Ratio Values for Each Producing Well

| Well | Water/oil ratio base avg. | Water/oil ratio post avg. | Decrease, % | Rank |
|---|---|---|---|---|
| CBP2 | 72 | 66.5 | 7.9 | 9 |
| CCP1 | 22 | 19.9 | 8.3 | 8 |
| CCP3 | 46 | 30.3 | 33.8 | 2 |
| SAP1 | 18 | 15 | 16.7 | 6 |
| SAP2 | 55 | 44.4 | 19.4 | 5 |
| SP47R | 162 | 98.6 | 39.2 | 1 |
| SAP4 | 77 | 66 | 14.3 | 7 |
| SBP1 | 44 | 30.5 | 30.4 | 3 |
| SBP2 | 32 | 30.2 | 5.3 | 10 |
| SBP3 | 46 | 36.5 | 20.8 | 4 |

Thus, injection of an empirically-derived microbial formulation, devised in accordance with the invention, improved the rate of oil production at the Mink Unit site by approxximately 13%. Moreover, the injection of the microbial formulation decreased the water/oil ratio at all monitored producing wells in the Mink Unit, some by as such as 35%. Surprisingly, some of the injected microorganisms were able to propagate through the formation to a producing well, while no adverse affects on injectivity were caused by the microbial treatment, as injection pressures remained constant.

We claim:

1. A method for recovering oil from an oil-bearing reservoir, said reservoir having at least one injection well and at least one production well, said method comprising the steps of:
    (a) introducing into an injection well of said reservoir substantially only (A) a microbial formulation comprising (i) a first species of microorganism which secretes a surfactant and (ii) a second species of microorganism which is a species from the genus Clostridium, and which secretes a solvent selected from the group consisting of alcohols, ketones and acids; and (B) a nutrient composition which consists essentially of an aqueous solution of nutrients capable of supporting growth of the microorganisms of said formulation, the species of microorganisms in said formulation being capable, upon incubation after injection with a nutrient into said reservoir, of surviving in said reservoir and said formulation being capable of displacing oil present at a concentration not substantially greater than waterflood residual oil saturation;
    (b) shutting-in said injection well for an amount of time sufficient for the species of microorganisms of said microbial formulation to acclimate to said reservoir;
    (c) after step (b) injecting a fluid into said injection well to drive said displaced oil to said production well.

2. A method according to claim 1 wherein said first species of microorganism is *Bacillus licheniformis*.

3. A method according to claim 2 wherein said nutrient composition consists essentially of an aqueous solution of molasses.

4. A method according to claim 3 wherein at least a part of said nutrient composition is introduced into said injection well prior to the introduction of any of said microbial formulation.

5. A method according to claim 1 wherein said second species is selected from the group consisting of ATCC #53797 and ATCC #53798.

6. A method for recovering oil from an oil-bearing reservoir, said reservoir having at least one injection well and at least one production well, said method comprising the steps of:
    (a) introducing into an injection well of said reservoir substantially only (A) a microbial formulation comprising (i) a substantially pure culture of *Bacillus licheniformis*, strain JF-2 (ATCC #39307) and (ii) a substantially pure culture of a solvent-secreting species of microorganism from the genus Clostridium which is selected from the group consisting of ATCC #53797 and ATCC #53798, said cultures of microorganisms being injected sequentially, in an order which is reverse to the ordering according to motility; and (B) a nutrient composition which consists essentially of an aqueous solution of nutrients capable of supporting growth of the microorganisms of said formulation, the species of microorganisms in said formulation being capable, upon incubation after injection with a nutrient into said reservoir, of surviving in said reservoir and said formulation being capable of displacing oil present at a concentration not substantially greater than waterflood residual oil saturation, said nutrients being injected before each of said sequential injections of said cultures of microorganisms;
    (b) shutting-in said injection well for an amount of time sufficient for the species of microorganisms of said microbial formulation to acclimate to said reservoir;
    (c) after step (b) injecting a fluid into said injection well to drive said displaced oil to said production well.

7. A method according to claim 6 further comprising injecting a mixture which comprises each of the species of said microbial formulation, subsequent to said sequential injections of said substantially pure cultures.

8. A method for recovering oil from an oil-bearing reservoir by sequentially injecting substantially pure cultures of microorganisms, said reservoir having at least one injection well and at east one production well, said method comprising the steps of:
(a) introducing into an injection well of said reservoir a substantially pure culture of *Bacillus licheniformis*, which species of microorganism secretes a surfactant;
(b) introducing into an injection well of said reservoir a substantially pure culture of a species of microorganism from the genus Clostridium, which species secretes a solvent selected from the group consisting of alcohols, ketones and acids, said cultures being injected sequentially in a predetermined order;
(c) introducing into said injection well a nutrient composition which consists essentially of an aqueous solution of nutrients capable of supporting growth of the microorganisms, a species of said sequentially injected microorganisms being capable, upon incubation after injection with a nutrient into said reservoir, of surviving in said reservoir and said sequentially injected microorganisms being capable of displacing oil at a concentration not substantially greater than water flood residual oil saturation;
(d) shutting-in said injection well for an amount of time sufficient for said sequentially injected species of microorganisms to acclimate to said reservoir; and
(e) after step (d) injecting a fluid into said injection well to drive said displaced oil to said production well.

9. A method according to claim 8 wherein nutrients are injected before each of said sequential injections of said cultures of microorganisms.

10. A method according to each of claims 1, 2, 3, 8, and 9 wherein said microbial formulation consists of *Bacillus licheniformis* (ATCC #39307) and a Clostridum species from the group consisting of ATCC #53797 and ATCC #53798.

* * * * *

UNITED STATES PATENT AND TRADEMARK OFFICE
CERTIFICATE OF CORRECTION

PATENT NO. : 4,905,761

DATED : March 6, 1990

INVENTOR(S) : Rebecca S. Bryant

It is certified that error appears in the above-identified patent and that said Letters Patent is hereby corrected as shown below:

Column 2, Line 67:   After "symbol", insert --▲--.

Column 5, Line 67:   Change "Toruloosis" to --Torulopsis--.

Column 13, Line 4:   In the column heading of Table IV, change "of" to --or--.

Signed and Sealed this

Twenty-first Day of May, 1991

Attest:

HARRY F. MANBECK, JR.

Attesting Officer

Commissioner of Patents and Trademarks